United States Patent
Yamada et al.

(10) Patent No.: US 6,983,102 B2
(45) Date of Patent: Jan. 3, 2006

(54) MOTOR CONTROL DEVICE FOR VEHICULAR POWER MIRROR

(75) Inventors: Ayako Yamada, Fujieda (JP); Akiyoshi Kobayashi, Fujieda (JP); Mitsuyoshi Nagao, Fujieda (JP)

(73) Assignee: Murakami Corporation, Shizuoka (JP)

( * ) Notice: Subject to any disclaimer, the term of this patent is extended or adjusted under 35 U.S.C. 154(b) by 254 days.

(21) Appl. No.: 10/662,519

(22) Filed: Sep. 16, 2003

(65) Prior Publication Data

US 2004/0247299 A1    Dec. 9, 2004

(30) Foreign Application Priority Data

Jun. 3, 2003  (JP)  ............................. 2003-157483

(51) Int. Cl.
*H02P 5/00*  (2006.01)
(52) U.S. Cl. ................... 388/800; 388/805; 388/912; 318/600; 318/603; 318/632
(58) Field of Classification Search ............... 318/600, 318/603, 632, 138, 254, 439; 388/800, 805, 388/912; 327/207.13, 207.17, 207.22
See application file for complete search history.

(56) References Cited

U.S. PATENT DOCUMENTS

| | | | | |
|---|---|---|---|---|
| 5,315,442 A | * | 5/1994 | Sato et al. ................... 359/877 |
| 5,475,302 A | * | 12/1995 | Mehnert et al. ........ 324/207.17 |
| 6,023,136 A | * | 2/2000 | Pinewski .................... 318/254 |
| 6,621,062 B1 | * | 9/2003 | Tamagawa et al. ......... 250/206 |

FOREIGN PATENT DOCUMENTS

JP        2001-138812        5/2001

* cited by examiner

*Primary Examiner*—Rina Duda
(74) *Attorney, Agent, or Firm*—Oblon, Spivak, McClelland, Maier & Neustadt, P.C.

(57) ABSTRACT

When a signal level of a motor brush switching signal is low and thus dropouts or omission of the pulse signals converted by a waveform shaping part take place, so that an interval between a pulse signal to be currently counted and an immediately preceding pulse signal thereof becomes longer than a predetermined average interval, a pulse signal counter makes a correction of the number of counts by adding one pulse to the pulse to be counted. Therefore, even if the signal level of the motor brush switching signals generated from a vertical motion motor M2 is low for some reasons, accurate control can be exercised over the number of rotations of the vertical motion motor M2.

2 Claims, 7 Drawing Sheets

MOTOR CONTROL DEVICE FOR VEHICULAR POWER MIRROR

BACKGROUND OF THE INVENTION

This invention relates to a motor control device for a vehicular power mirror, which is used to vary the number of rotations of a driving motor incorporated in a power mirror, such as a door mirror and a fender mirror, for a vehicle.

In general, the power mirror such as a door mirror and a fender mirror for a vehicle includes two driving motors for adjustment of mirror surface orientation: a vertical motion motor tilts a mirror surface up and down; a lateral motion motor tilts the mirror surface left and right.

One example of control devices for the above vehicular power mirror is disclosed in Japanese Laid-Open Patent Application, Publication No. 2001-138812 (the applicant of which is the assignee of the instant application), in which control is exercised utilizing the number of rotations of a driving motor. In this disclosure, a direct current brush motor is adapted for the driving motor. This control device includes a driving motor, a motor signal detector, and a pulse signal counter. In the motor signal detector, a pickup coil connected in series with the driving motor detects high-frequency motor brush switching signals generated from the driving motor, and the motor signal detector outputs thus-detected high-frequency motor brush switching signals shaped in a waveform of pulse signals. The pulse signal counter counts the pulse signals output from the motor signal detector.

According to the control device as above, if the signal level of the motor brush switching signals generated from the driving motor is low due to wear of the brush or a defective condition of the brush contact in the driving motor, dropouts or omission of the pulse signals could possibly take place because the motor brush switching signals could not accurately be shaped into the waveform of pulse signals. In this instance, accurate control could not be exercised over the number of rotations of the driving motor, to the extent that adjustment accuracy of the mirror surface orientation would disadvantageously deteriorate.

The present invention has been made in order to address the above disadvantages, and it is an exemplary general object of the present invention to provide a motor control device for a vehicular power mirror, in which accurate control can be exercised over the number of rotations of a driving motor even under conditions where the signal level of motor brush switching signals generated from the driving motor is low for various reasons.

SUMMARY OF THE INVENTION

In one exemplified aspect of the present invention, a motor control device for a vehicular power mirror comprises: a driving motor that is constructed of a direct current brush motor; a motor signal detector that utilizes a pickup coil connected in series with the driving motor to detect high-frequency motor brush switching signals generated from the driving motor, and outputs the detected high-frequency motor brush switching signals shaped in a waveform of pulse signals; and a pulse signal counter that counts the pulse signals, wherein the pulse signal counter makes a correction of the number of counts by adding one pulse thereto every time an interval between a pulse signal to be currently counted and an immediately preceding pulse signal thereof is longer than a predetermined average interval.

According to the above motor control device for a vehicular power mirror, if the signal level of the motor brush switching signals generated from the driving motor is low for some reasons and thus dropouts or omission of the pulse signals take place, an interval between a pulse signal to be currently counted and an immediately preceding pulse signal thereof becomes longer than a predetermined average interval; therefore, the pulse signal counter makes a correction of the number of counts by adding one pulse thereto. Accordingly, even if the signal level of the motor brush switching signals generated from the driving motor is low for some reasons, accurate control can be exercised over the number of rotations of the driving motor.

In the above arrangement, immediately after the driving motor starts operating or immediately before the driving motor stops operating, a rotational speed of the driving motor would become unstable, so that an error would likely be produced in the correction of the number of counts made by the pulse signal counter because an interval between adjacent pulse signals would exhibit a wide range of variation. Accordingly, in the motor control device for a vehicular power mirror according to the present invention, the correction of the number of counts by the pulse signal counter may preferably be made during a period of time when the rotational speed of the driving motor is stable.

Other objects and further features of the present invention will become readily apparent from the following description of preferred embodiments with reference to accompanying drawings.

DETAILED DESCRIPTION OF THE PREFERRED EMBODIMENTS

A description will be given of preferred embodiments of a motor control device for a vehicular power mirror according to the present invention with reference to the drawings.

Figure 1:
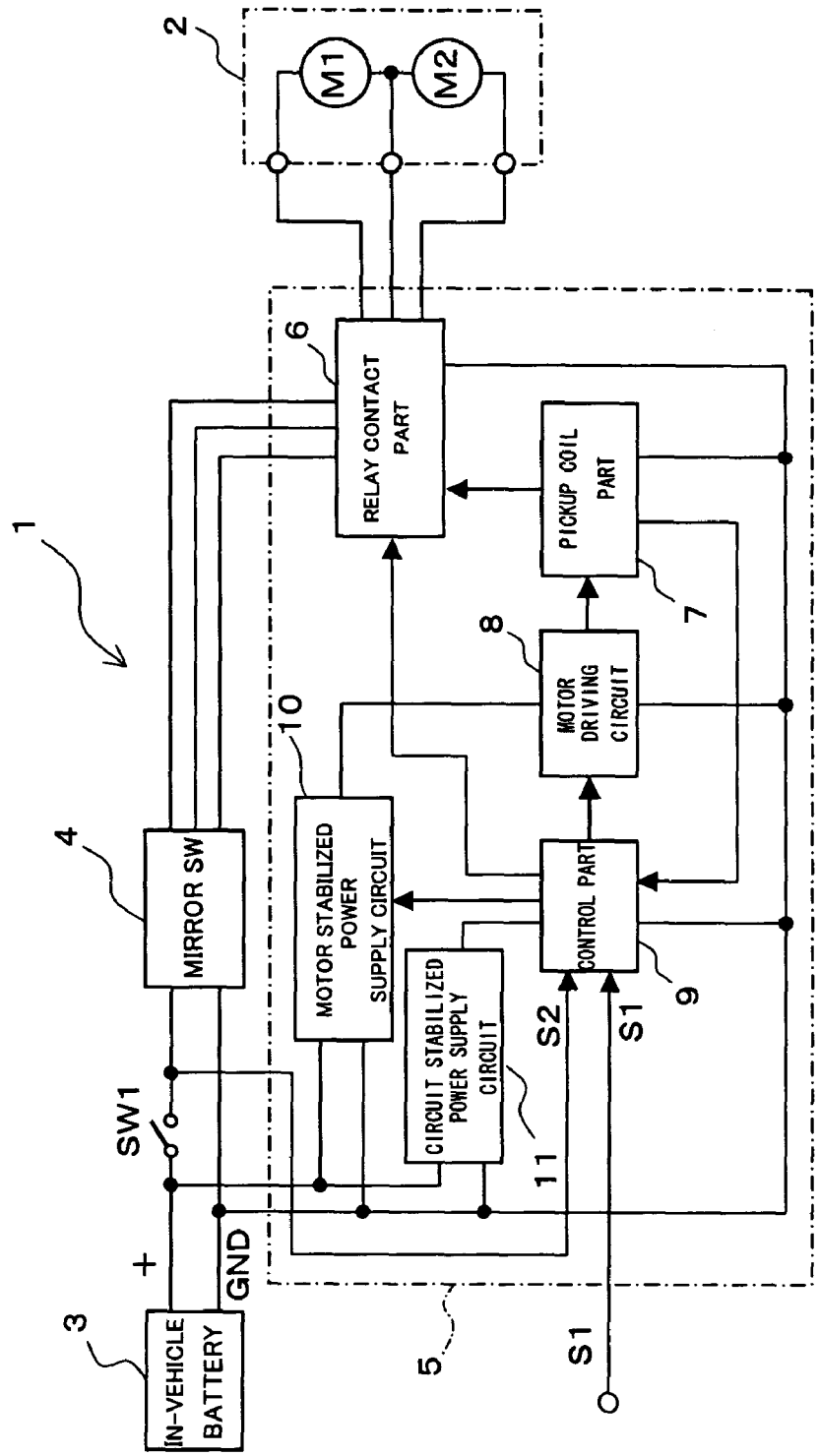
FIG. 1 is a schematic block diagram showing one exemplified embodiment of a motor control device for a vehicular power mirror according to the present invention.
Figure 2:
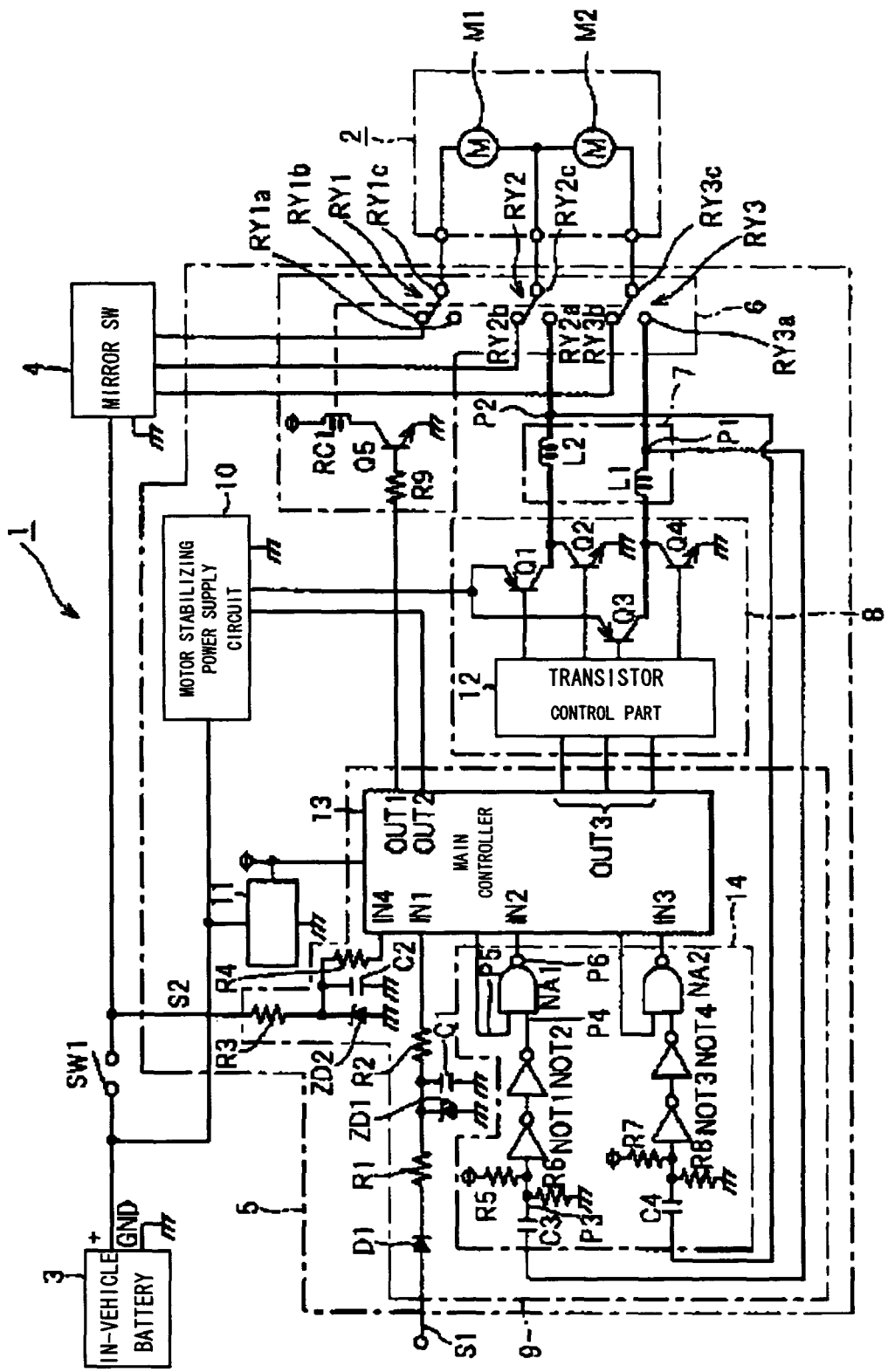
FIG. 2 is a schematic circuit diagram of the motor control device as shown in FIG. 1.

As shown in FIGS. 1 and 2, a motor control device 1 for a vehicular power mirror as one exemplary embodiment of the present invention controls rotations of a lateral motion motor M1 and a vertical motion motor M2 both incorporated in a door mirror 2 for a vehicle (not shown) as a driving motor. The lateral motion motor M1 and the vertical motion motor M2 are each comprised of a direct current brush motor. The lateral motion motor M1 is adapted to adjust mirror surface orientation to tilt left and right, while the vertical motion motor M2 is adapted to adjust the mirror surface orientation to tilt up and down.

The motor control device 1 is adapted to control rotations of the lateral motion motor M1 and the vertical motion motor M2 in accordance to a switching operation performed by a driver of the vehicle (not shown), and is also adapted to control the rotation of the vertical motion motor M2 in accordance with a reverse signal S1 that is output when a shift lever of the vehicle is operated to shift gears to a reverse position.

The motor control device 1 includes an in-vehicle battery 3 that is a direct-current power supply for applying a direct current, a mirror switch 4 that selectively supplies the current from the in-vehicle battery 3 to the lateral motion motor M1 and/or the vertical motion motor M2 in accordance with the operation by the driver, and an interlock control unit 5 that normally controls rotations of the both lateral motion motor M1 and vertical motion motor M2 in accordance with a manual operation of the mirror switch 4, but on receipt of a reverse signal S1, controls the rotation of the vertical motion motor M2 only, exercising a ganged control over the vertical motion motor M2 in accordance with the input of the reverse signal S1 (i.e., in a manner interlocked with the reverse operation).

The interlock control unit 5 is designed to control the rotation of the vertical motion motor M2 so that when a reverse signal S1 is input, the mirror surface of the door mirror 2 is adjusted to tilt down from a home-position angle to a predetermined angle at which the driver can view an area near a rear wheel of the vehicle (not shown), and when the input of the reverse signal S1 stops, the mirror surface is adjusted to tilt back from the predetermined angle to the home-position angle.

The interlock control unit 5 includes a relay contact part 6 that switches the operations of the lateral motion motor M1 and/or the vertical motion motor M2 between a manual operation control and an interlock control operation, a pickup coil part 7 that detects high-frequency motor brush switching signals generated with rotation of the vertical motion motor M2, a motor driving circuit 8 that can apply voltage to the vertical motion motor M2 by switching polarity in response to the detection by the pickup coil part 7, a control part 9 that controls the number of rotations of the vertical motion motor M2 in accordance with the motor brush switching signals detected by the pickup coil part 7.

The interlock control unit 5 is provided with a motor stabilized power supply circuit 10 that stabilizes a voltage fed from the in-vehicle battery 3 to the motor driving circuit 8, and a circuit stabilized power supply circuit 11 that stabilizes a voltage fed from the in-vehicle battery 3 to the control part 9. Between the in-vehicle battery 3 and the mirror switch 4 is provided an ignition switch SW1 for the vehicle (not shown), and an ON/OFF signal S2 of the ignition switch SW1 is transmitted to the control part 9.

As shown in FIG. 2, the motor driving circuit 8 includes four switching transistors Q1–Q4 that undergo ON/OFF control of a transistor control part 12. Among them, the switching transistors Q1, Q3 are pnp transistors, and the switching transistors Q2, Q4 are npn transistors. The transistor control part 12 exerts ON/OFF control in such a manner as to turn the switching transistors Q1, Q4 on when the vertical motion motor M2 is to be normally rotated, and to turn the switching transistors Q2, Q3 on when the vertical motion motor M2 is to be reversely rotated.

The relay contact part 6 includes an npn switching transistor Q5 whose base is connected through a resistor R9 to the control part 9, a relay coil RC1 which is connected with a collector of the switching transistor Q5, and three relay contacts RY1–RY3 that switch contacts in accordance with excitation of the relay coil RC1. In the relay contacts RY1–RY3, terminals RY1b, RY2b and RY3b respectively provided therein are connected to the mirror switch 4. A terminal RY1c of the relay contact RY1 is connected to one terminal of the lateral motion motor M1, a terminal RY2c of the relay contact RY2 is connected to the other terminal of the lateral motion motor M1 and one end of the vertical motion motor M2, and a terminal RY3c of the relay contact RY3 is connected to the other terminal of the vertical motion motor M2. A terminal RY2a of the relay contact RY2 and a terminal RY3a of the relay contact RY3 are connected to the pickup coil part 7.

The pickup coil part 7 is comprised of two pickup coils L1, L2 for taking out motor brush switching signals from high-frequency components in a current flowing across the vertical motion motor M2. The pickup coil L1 is provided between the switching transistor Q4 (Q3) of the motor driving circuit 8 and the terminal RY3a of the relay contact part 6. On the other hand, the pickup coil L2 is provided between the switching transistor Q1 (Q2) of the motor driving circuit 8 and the terminal RY2a of the relay contact part 6. One end P1 of the pickup coil L1 connected to the relay contact part 6 and one end P2 of the pickup coil L2 connected to the relay contact part 6 are also connected to the control part 9, so as to output the detected high-frequency motor brush switching signals to the control part 9.

The control part 9 includes a main controller 13, a waveform shaping part 14, and various other circuit elements. The waveform shaping part 14 shapes the high-frequency motor brush switching signals detected by the pickup coils L1, L2 of the pickup coil part 7 into a waveform of pulse signals, respectively, and outputs to the main controller 13. The waveform shaping part 14 and the pickup coil part 7 constitute a motor signal detector.

The waveform shaping part 14 is provided with a series circuit including an alternating-current pass capacitor C3, an inverter circuit NOT1, an inverter circuit NOT2 and a NAND circuit NA1 which are sequentially connected in series to the end P1 of the pickup coil L1, and with a series circuit including an alternating-current pass capacitor C4, an inverter circuit NOT3, an inverter circuit NOT4 and a NAND circuit NA2 which are sequentially connected in series to the end P2 of the pickup coil L2.

An output end of the NAND circuit NA1 connected to the end P1 of the pickup coil L1 is connected to an input terminal IN2 of the main controller 13, and an output end of the NAND circuit NA2 connected to the end P2 of the pickup coil L2 is connected to an input terminal IN3 of the main controller 13. The other input terminal of each NAND circuit NA1, NA2 is connected to the main controller 13 and supplied with rectangular wave signals (as will be described later) output from the main controller 13.

Between the alternating-current pass capacitor C3 and the inverter circuit NOT1 are provided two nodes: one connected through a resistor R5 to a power supply potential, and the other connected through a resistor R6 to a ground potential. Similarly, between the alternating-current pass capacitor C4 and the inverter circuit NOT3 are provided two nodes: one connected through a resistor R7 to a power supply potential, and the other connected through a resistor R8 to a ground potential.

The main controller 13 is constituted of hardware of a microcomputer including a CPU (Central Processing Unit), a ROM (Read Only Memory), a RAM (Random Access Memory), etc., as well as software. To the input terminal IN1 of the main controller 13, reverse signals S1 are supplied through a circuit including a diode D1, a resistor R1, a Zener diode ZD1, a capacitor C1 and a resistor R2. To the input terminal IN4 of the main controller 13, ON signals S2 of the ignition switch SW1 are supplied through a circuit including a resistor R3, a Zener diode ZD2, a capacitor C2 and a resistor R4.

On the other hand, an output terminal OUT1 of the main controller 13 is connected to a base of the switching transistor Q5 through the resistor R9; an output terminal OUT2 is connected to the motor stabilized power supply circuit 10; and an output terminal OUT3 is connected to the transistor control part 12.

Figure 3:
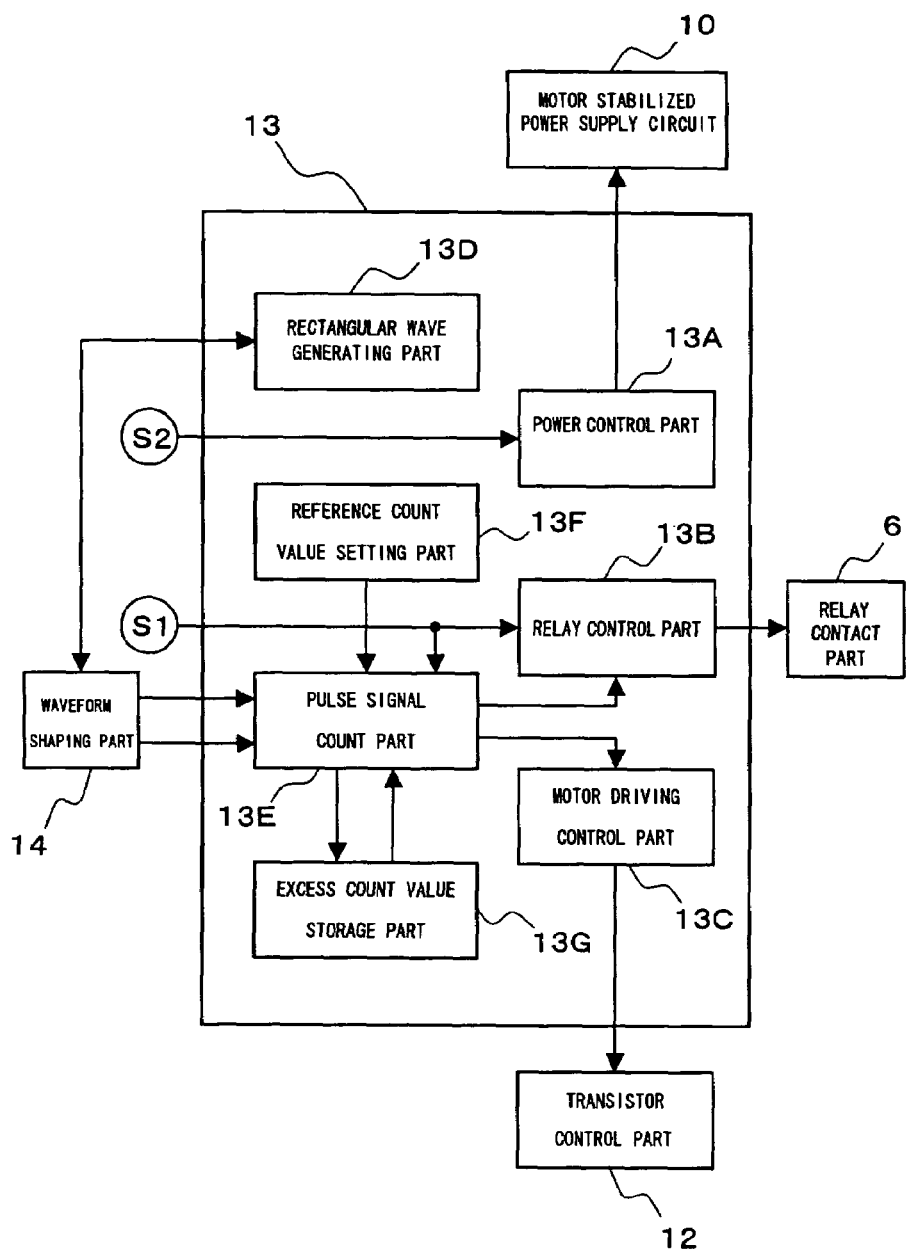
FIG. 3 is a block diagram showing functions of a main controller as shown in FIG. 2.

In the main controller 13, as shown in FIG. 3, a power control part 13A, a relay control part 13B, a motor driving control part 13C, a rectangular wave generating part 13D, a pulse signal count part 13E (or pulse signal counter), a reference count value setting part 13F, an excess count value storage part 13G, and the like are implemented as software modules.

The power control part 13A is adapted to turn the motor stabilized power supply circuit 10 on in accordance with an ON signal S2 of the ignition switch SW1. The relay control part 13B is adapted to output a driving signal to the base of the switching transistor Q5 in the relay contact part 6 when a reverse signal S1 is input, and to stop outputting the driving signal to the switching transistor Q5 when the input of the reverse signal S1 is stopped and the mirror surface of the door mirror 2 returns to the home position.

The motor driving control part 13C is adapted to output a control signal for controlling an ON/OFF operation of each switching transistor Q1–Q4 of the motor driving circuit 8 to the transistor control part 12. The rectangular wave generating part 13D is adapted to detect the rotational speed of the vertical motion motor M2 based upon pulse signals input from the waveform shaping part 14, and to generate and transmit a rectangular wave having a wavelength corresponding to an ON period of time according to the detected rotational speed to the input terminals of the NAND circuits NA1, NA2 of the waveform shaping part 14.

The pulse signal count part 13E as a pulse signal counter receives pulse signals from the waveform shaping part 14 as a motor signal detector, and counts the number of pulses thereof. The pulse signal count part 13E is adapted to make a correction of the number of counts by adding one pulse thereto every time an interval between a pulse signal to be currently counted and an immediately preceding pulse signal thereof is longer than a predetermined average interval.

The reference count value setting part 13F predetermines, as a reference count value of pulse signals, the number of rotations of the vertical motion motor M2 to be made when the mirror surface of the door mirror 2 is adjusted in an initial setting mode to tilt down from a home-position angle to a predetermined angle at which the driver can view an area near a rear wheel of the vehicle.

The above pulse signal count part 13E stores a count value of the number of pulses exceeding the reference count value determined by the reference count value setting part 13F, as an excess count value as a result of rotations made by coasting of the vertical motion motor M2, in the excess count value storage part 13G. Further, the pulse signal count part 13E, in principle, outputs a control signal for instructing the motor driving control part 13C to stop the rotation of the vertical motion motor M2 when the count value of pulse signals reaches the reference count value, and thereafter if the input of the reverse signal S1 stops, outputs a control signal for instructing the motor driving control part 13C to reversely rotate the vertical motion motor M2.

The vertical motion motor M2 as a component of one exemplary embodiment of the present invention is comprised, for example, of a three-pole direct current brush motor, and generates six motor brush switching signals per one rotation. Accordingly, the reference value setting part 13F determines a reference count value by multiplying a required number of rotations of the vertical motion motor M2 by six.

In this embodiment of the motor control device 1 having a construction as described above, when the ignition switch SW1 as shown in FIGS. 1 and 2 is turned on by the driver of the vehicle (not shown), the in-vehicle battery 3 is connected to the lateral motion motor M1 and the vertical motion motor M2 via the mirror switch 4 and the relay contact part 6.

At this stage, in the relay contact part 6, since the switching transistor Q5 is in an OFF position and the relay coil RC1 is not excited, the relay contacts RY1–RY3 are connected to the terminal RY1b–RY3b, respectively. Therefore, the mirror switch 4 is brought into conduction via the relay contact part 6 with the lateral motion motor M1 and the vertical motion motor M2.

Under these circumstances, if the driver operates the mirror switch 4 to normally or reversely rotate the lateral motion motor M1, the mirror surface of the door mirror 2 is adjusted to orient to the left or to the right. Similarly, if the driver operates the mirror switch 4 to normally or reversely rotate the vertical motion motor M2, the mirror surface of the door mirror 2 is adjusted to tilt up or down.

On the other hand, when the ignition switch SW1 is turned on, a thus-generated ON signal S2 is transmitted to the main controller 13 of the control part 9 in the interlock control unit 5. Then, the ON signal S2 is input to the power control part 13A of the main controller 13 as shown in FIG. 3, so that the power control part 13A turns on the motor stabilized power supply circuit 10.

Figure 4:
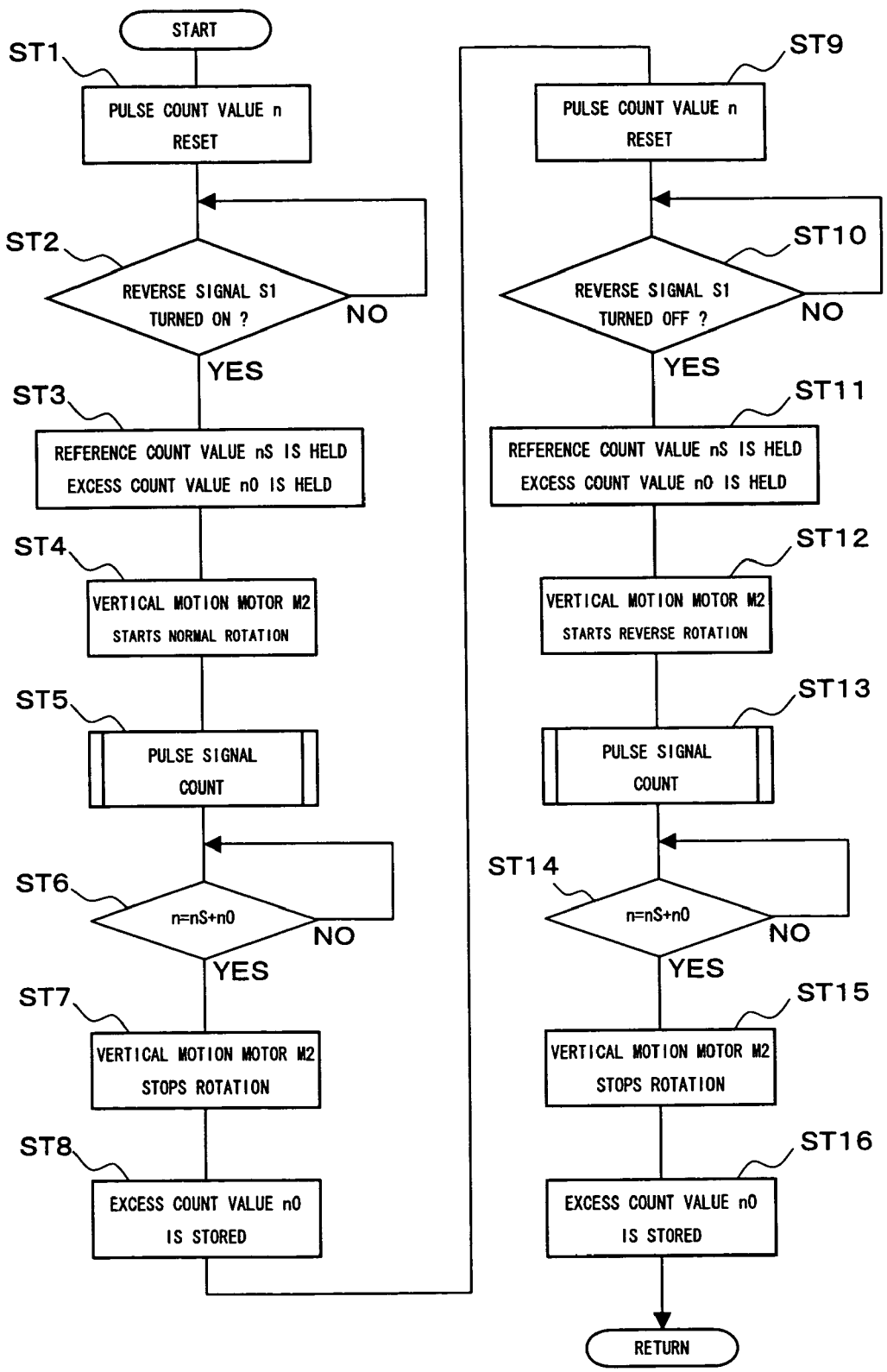
FIG. 4 is a flowchart showing a series of process steps performed by the main controller as shown in FIG. 3.

Subsequently, the main control part 13 controls the rotation of the vertical motion motor M2 in accordance with the process steps as shown in the flowchart of FIG. 4. First, a count value n of pulse signals counted by the pulse signal count part 13E is reset (step ST1). Next, it is determined whether the reverse signal S1 has been turned on or not (step ST2). This determination step is repeated until it is determined that the reverse signal S1 has been turned on (YES).

At this stage, if the driver operates the shift lever of the vehicle (not shown) to shift gears to the reverse position, a reverse signal S1 is transmitted to the pulse signal count part 13E and relay control part 13B of the main controller 13, and thus the determination in step ST2 results in YES.

Next, in step ST3, the reference count value nS determined in the reference count value setting part 13F and the excess count value nO stored in the excess count value storage part 13G are held in the pulse signal count part 13E.

Next, in step ST4, the vertical motion motor M2 is driven to normally rotate, in accordance with the following process steps. First, the relay control part 13B, which has received the reverse signal S1, turns the switching transistor Q5 of the relay contact part 6 on, and the relay coil RC1 is excited to connect the relay contacts RY1–RY3 to the terminals RY1a–RY3a, respectively.

Subsequently, the pulse signal count part 13E, which has received the reverse signal S1, outputs a control signal for normally rotating the vertical motion motor M2 to the motor driving control part 13C, and the motor driving control part 13C in turns outputs a control signal for turning the switching transistors Q1, Q4 on, as well as for turning the switching transistors Q3, Q2 off, to the transistor control part 12. Consequently, a normal rotation circuit for the vertical motion motor M2 is established between the vertical motion motor M2 and the motor stabilized power supply circuit 10, driving the vertical motion motor M2 to normally rotate so as to tilt the mirror surface of the door mirror 2 downward from a home-position angle (at which the driver is provided with a view of an area behind the vehicle through the mirror surface during a normal forward driving) to a predetermined angle (at which the driver is provided with a view of an area near a rear wheel of the vehicle during a backward driving).

As the vertical motion motor M2 starts rotating in a normal direction, the pickup coil L1 of the pickup coil part 7 detects high-frequency motor brush switching signals generated with the rotation, and the waveform shaping part 14 converts the motor brush switching signals into pulse signals, which are transmitted to the pulse signal count part 13E of the main controller 13. The pulse signal count part 13E then counts the number of the transmitted pulse signals (step ST5).

Next, in step ST6, it is determined whether or not the pulse count value n counted by the pulse signal count part 13E has reached a value resulting from the addition of the excess count value nO to the reference count value nS. The determination is repeated until it is determined that the resultant pulse count value n reaches the value (YES).

If the determination in step ST6 results in YES, the pulse signal count part 13E outputs a control signal for stopping the rotation of the vertical motion motor M2 to the motor driving control part 13C. The motor driving control part 13C in turn outputs a control signal for turning the switching transistors Q1, Q4 of the motor driving circuit 8 off. Consequently, the normal rotation circuit of the vertical motion motor M2 is broken, and thus the vertical motion motor M2 stops rotating, so that the mirror surface of the door mirror 2 is adjusted to orient at the predetermined angle (at which the driver is provided with a view of an area near a rear wheel of the vehicle during a backward driving) (step ST7).

At this stage, the vertical motion motor M2 usually coasts and makes some extra rotation by a predetermined amount (angle) even after the switching transistors Q1, Q4 are turned off. Thus, in the subsequent step ST8, a count value of the number of pulses which exceeds the reference count value is outputted from the pulse signal count part 13E as a corrected excess count value nO reflecting the coasting of the vertical motion motor M2 to the excess count value storage part 13G, and the excess count value storage part 13G in turn stores the corrected excess count value nO.

Next, in step ST9, in preparation for reverse rotation of the vertical motion motor M2 to tilt the mirror surface of the door mirror 2 back to the home-position angle, the count value n of pulse signals in the pulse signal count part 13E is reset. Subsequently, it is determined whether or not the reverse signal S1 has been turned off (step ST10). The determination is repeated until it is determined that the reverse signal S1 is turned off (YES).

At this stage, if the driver operates the shift lever of the vehicle (not shown) to shift gears from the reverse position to any other position such as the neutral position, parking position, etc., the input of the reverse signal S1 to the main controller 13 stops, and thus the determination in step ST10 results in YES.

In the subsequent step ST11, the reference count value nS determined in the reference count value setting part 13F and the excess count value nO that has newly been stored in the excess count value storage part 13G are held in the pulse signal count part 13E.

Next, in step ST12, once the input of the reverse signal S1 to the pulse signal count part 13E has stopped, the pulse signal count part 13E outputs a control signal for reversely rotating the vertical motion motor M2 to the motor driving control part 13C, and the motor driving control part 13C in turn outputs a control signal for turning the switching transistors Q1, Q4 of the motor driving circuit 8 off and turning the switching transistors Q3, Q2 on to the transistor control part 12. As a result, a reverse rotation circuit for the vertical motion motor M2 is established between the vertical motion motor M2 and the motor stabilized power supply circuit 10, and thus the vertical motion motor M2 is driven to reversely rotate so that the mirror surface of the door mirror 2 tilts upward from the predetermined angle back (at which the driver is provided with a view of an area near a rear wheel of the vehicle during a backward driving) back to the home-position angle (at which the driver is provided with a view of an area behind the vehicle through the mirror surface during a normal forward driving).

As the vertical motion motor M2 starts rotating in a reverse direction, the pickup coil L2 of the pickup coil part 7 detects high-frequency motor brush switching signals generated with the rotation, and the waveform shaping part 14 converts the motor brush switching signals into pulse signals, which are transmitted to the pulse signal count part 13E of the main controller 13. The pulse signal count part 13E then counts the number of the transmitted pulse signals (step ST13).

In the subsequent step ST14, it is determined whether or not the pulse count value n counted by the pulse signal count part 13E has reached a value resulting from the addition of the excess count value nO to the reference count value nS. The determination is repeated until it is determined that the resultant pulse count value n reaches the value (YES).

If the determination in step ST14 results in YES, the pulse signal count part 13E outputs a control signal for stopping the rotation of the vertical motion motor M2 to the motor driving control part 13C. The motor driving control part 13C in turn outputs a control signal for turning the switching transistors Q3, Q2 of the motor driving circuit 8 off. Consequently, the reverse rotation circuit of the vertical motion motor M2 is broken, and thus the vertical motion motor M2 stops rotating, so that the mirror surface of the door mirror 2 is adjusted back to orient at the home-position angle (at which the driver is provided with a view of an area behind the vehicle through the mirror surface during a normal forward driving) (step ST15).

Lastly, in step ST16, the pulse signal count part 13E outputs a count value of the number of pulses exceeding the reference count value, as a new excess count value nO as a result of rotations made by coasting of the vertical motion motor M2, to the excess count value storage part 13G, and stored in the excess count value storage part 13G.

Figure 5:
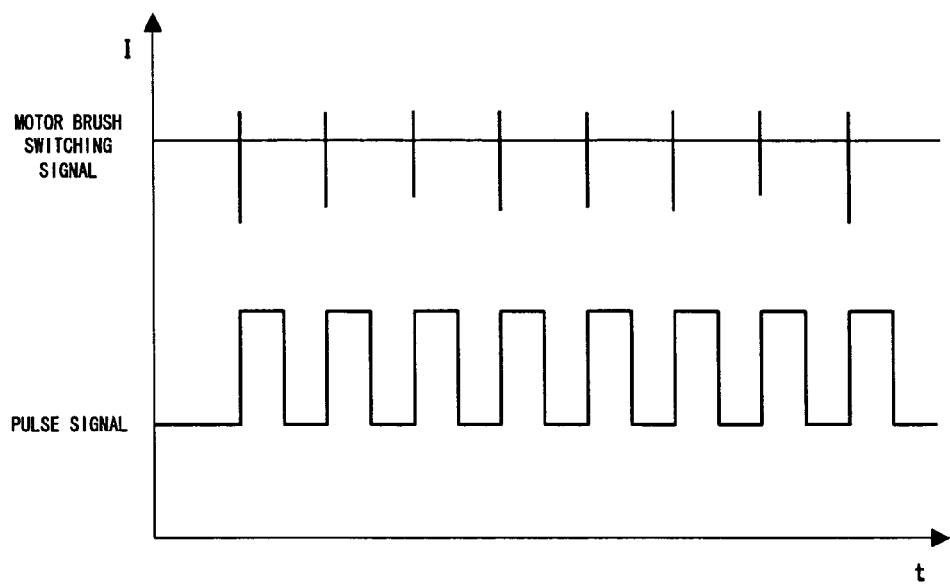
FIG. 5 contrastively shows waveforms of motor brush switching signals detected by a pickup coil as shown in FIG. 2, and pulse signals resulting from conversion by a waveform shaping part as shown in FIG. 2.
Figure 6:
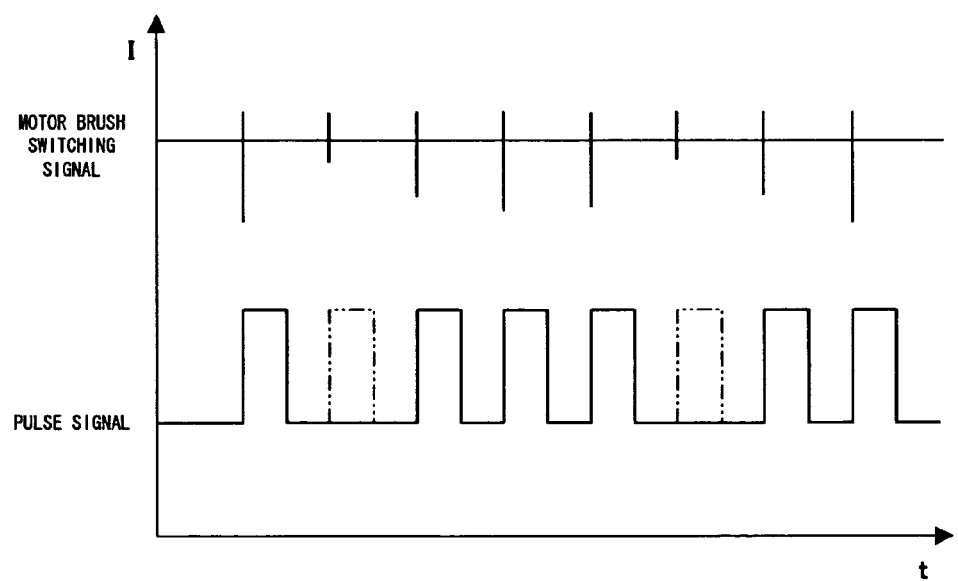
FIG. 6 is waveforms corresponding to those shown in FIG. 5, in which omission of pulse signals caused by a low signal level of the motor brush switching signals is observed.

In the aforementioned step ST5 (ST13) of counting pulse signals, if the high-frequency motor brush switching signals detected by the pickup coil L1 (L2) of the pickup coil part 7 is higher than a predetermined signal level as shown in FIG. 5, the waveform shaping part 14 can convert all the motor brush switching signals into pulse signals. However, if the signal level of the motor brush switching signals generated from the vertical motion motor M2 is low due to wear of the brush or a defective condition of the brush contact in the vertical motion motor M2, then the waveform shaping part 14 cannot shape the waveforms of the low level of the motor brush switching signals into pulse signals, and thus dropouts or omission of the pulse signals as indicated by dash double dot lines in FIG. 6 would take place in the pulse signals converted in the waveform shaping part 14.

Figure 7:
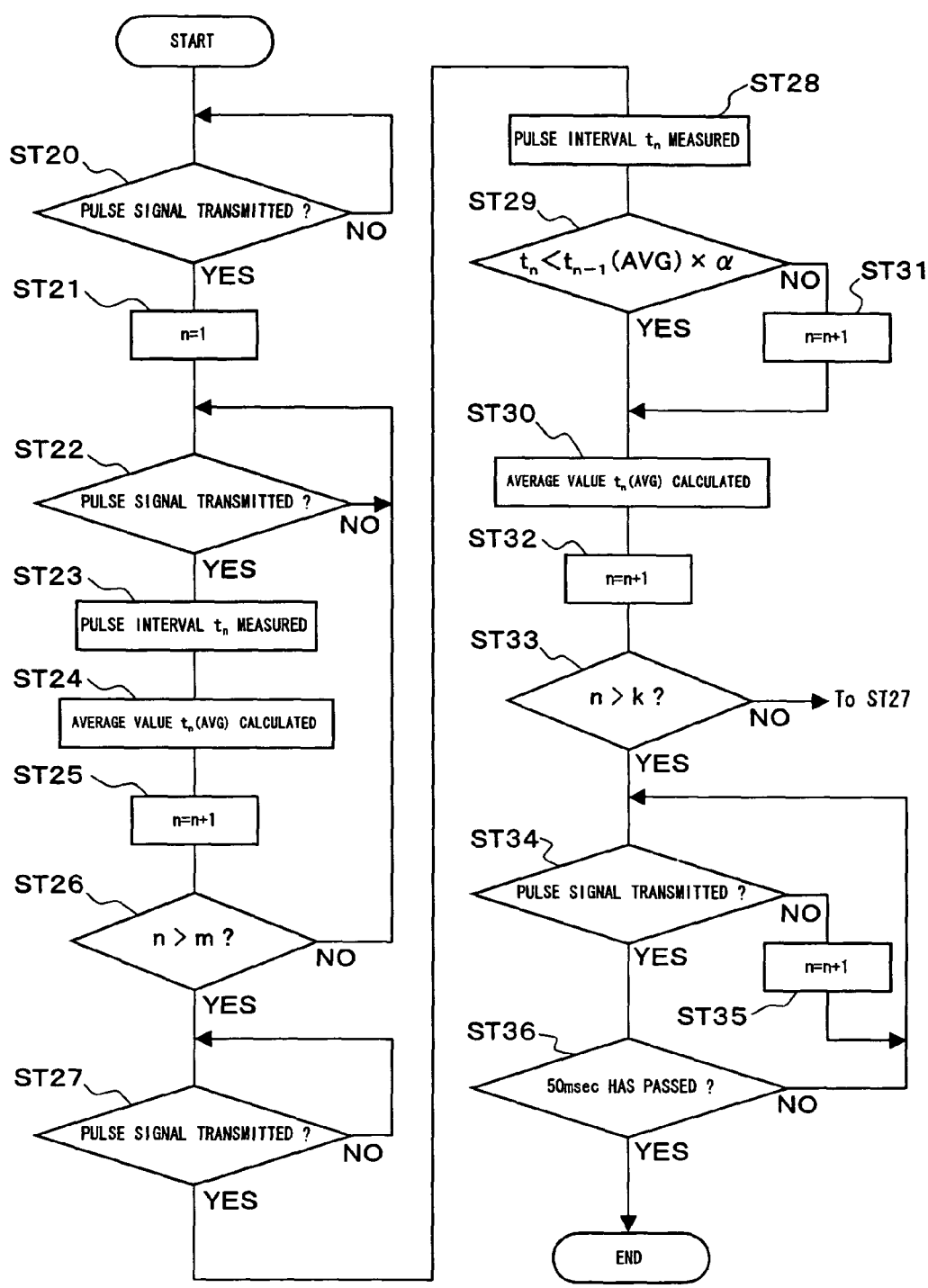
FIG. 7 is a flowchart showing process steps of a subroutine as shown by steps ST5 and ST13 in FIG. 4.

Therefore, according to this embodiment of the motor control device 1, in order to accurately detect the rotation of the vertical motion motor M2 even when such omission or dropouts of the pulse signals take place, steps ST20–ST36 shown in the flowchart of FIG. 7 are executed in subroutines of the steps ST5 and ST13 shown in FIG. 4.

First, in step ST20, it is determined whether or not a pulse signal is transmitted to the pulse signal count part 13E. The determination is repeated until it is determined that a pulse signal is transmitted (YES). When it is determined in step ST20 that a first pulse signal is transmitted to the pulse count part 13E, i.e., the determination results in YES, the pulse count value n is incremented so that "n=1" is satisfied (step ST21).

Subsequently, it is determined, as in step ST20, whether or not a pulse signal is transmitted to the pulse signal count part 13E (step ST22). When it is determined in step ST22 that a second pulse signal is transmitted to the pulse signal count part 13E, i.e., the determination results in YES, a pulse interval $t_n$ between the first pulse signal and the second pulse signal is measured (step ST23), and then an average pulse interval value $t_n(AVG)$ is calculated (step ST24).

Figure 8:
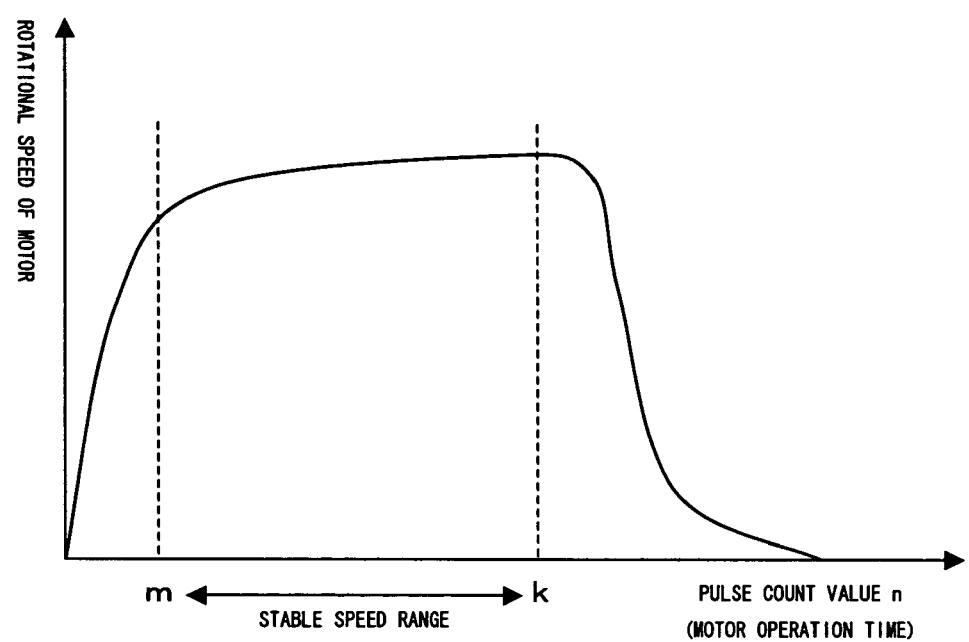
FIG. 8 is a graph showing a change in rotational speed of a vertical motion motor as shown in FIG. 1.

In the subsequent step ST25, the pulse count value n is incremented by one so that "n=n+1 is satisfied, and thereafter it is determined whether or not the pulse count value n exceeds a predetermined value m (step ST26). This predetermined value m is determined as a count value of pulse signals counted when the rotational speed of the vertical motion motor M2 as shown in FIG. 8 has increased and reached a stable speed.

If it is determined in step ST26 that the pulse count value n has not exceeded the predetermined value m (NO), the process goes back to the determination in step ST 22, and subsequent steps ST23 through ST25 are executed again. If it is eventually determined in step ST26 that the pulse count value n has exceeded the predetermined value m (YES), it is determined as in step ST22 whether or not a pulse signal is transmitted to the pulse signal count part 13E (step ST27), and then, as in step ST23, a pulse interval value $t_n$ is calculated (step ST28).

In the next step ST29, it is determined whether or not the pulse interval value $t_n$ determined in step ST28 is smaller than a pulse interval value obtained by multiplying an immediately priorly calculated average pulse interval $t_{n-1}$ (AVG) by a predetermined coefficient α. This predetermined coefficient α is determined to be a certain value such that a pulse interval obtained by multiplying the average pulse interval value $t_{n-1}$ (AVG) by α is larger than a pulse interval represented when a dropout occurs in pulse signals converted by the waveform shaping part 14 as shown in FIG. 3. When the determination in step ST29 is made for the first time, the immediately priorly calculated average pulse interval value $t_{n-1}(AVG)$ is the average pulse interval value $t_n(AVG)$ calculated in step ST24.

If it is determined in step ST29 that the $t_n$ determined in step ST28 is smaller than a pulse interval value obtained by multiplying $t_{n-1}(AVG)$ by α (YES), it is assumed that no dropout has occurred in the pulse signals converted by the waveform shaping part 14, and the process goes to the next step ST30. On the other hand, if the determination results in NO, it is assumed that some dropouts have occurred in the pulse signals converted by the waveform shaping part 14, and the pulse count value n is incremented by one pulse so that "n=n+1" is satisfied (step ST31).

In the subsequent step ST30, the pulse interval $t_n$ determined in step ST28 is added to the previously calculated average pulse interval value $t_n(AVG)$ to calculate an average value, and thus the average pulse interval $t_n(AVG)$ is updated (step ST30). Thereafter, the pulse count value n is incremented so that "n=n+1" is satisfied (step ST32).

In the next step ST33, it is determined whether or not the pulse count value n has exceeded a predetermined value k. This predetermined value k is determined as a count value of pulse signals counted immediately before the rotational speed of the vertical motion motor M2 as shown in FIG. 8 lowers from the stable speed.

If it is determined in step ST33 that the pulse count value n has not exceeded the predetermined value k (NO), the process goes back to the determination in step ST27, and subsequent steps ST28 through ST32 are executed again. If it is eventually determined that the pulse count value n has exceeded the predetermined value k (YES), it is determined whether or not the input of the pulse signals has stopped (step ST34).

If the determination in step ST34 results in NO, and thus the pulse signals are still being transmitted, the pulse count value n is incremented so that "n=n+1" is satisfied (step ST35). The process in step ST35 is repeated until the determination in step ST34 results in YES.

Lastly, in step ST36, in order to make sure that the rotation of the vertical motion motor M2 has stopped, it is determined whether or not 50 msec has passed since the input of pulse signals stopped. If the determination in step ST 36 results in NO, then the process goes back to step ST34, while if the determination results in YES, then it is assumed that the rotation of the vertical motion motor M2 has stopped, and the series of the process steps is terminated. Consequently, the subroutines of steps ST5 and ST13 shown in FIG. 4 comes to an end.

As described above, in this embodiment of the motor control device 1, if a low signal level of the motor brush switching signal is generated with the rotation of the vertical motion motor M2, and thus omission or dropouts in pulse signals converted by the waveform shaping part 14 take place, with the result that an interval between a pulse signal to be currently counted and an immediately preceding pulse signal thereof is longer than a predetermined average interval, then the pulse signal count part 13E each time makes a correction of the number of counts by adding one pulse thereto.

According to this embodiment of the motor control device 1, even if the signal level of the motor brush switching signals generated from the vertical motion motor M2 is low for various reasons such as wear of the brush or a defective condition of the brush contact in the vertical motion motor M2, accurate control can be exercised over the number of rotations of the vertical motion motor M2. As a result, adjustments can accurately be performed of operations for tilting the mirror surface of the door mirror 2 down to orient at a predetermined angle and for tilting the mirror surface up to orient at a home-position angle.

Moreover, as described above, the correction of the number of counts by adding one pulse to the current count value to be made each time when dropouts occur in pulse signals is performed only during a stable speed period of time as shown in FIG. 8 when the rotational speed of the vertical motion motor M2 is stable; therefore, variations in intervals between adjacent pulse signals may be made small, so that more accurate control can be exercised over the number of rotations of the vertical motion motor M2.

Further, these operations and accompanying effects can be accomplished by functionality of the pulse signal count part 13E implemented in the form of software, thus without addition of extra hardware component, and can be used in a conventional motor control device with ease.

In cases where a radio noise reduction condenser is provided in parallel with the vertical motion motor M2 in the door mirror 2, a motor brush switching signal generated with rotation of the vertical motion motor M2 would disadvantageously be attenuated. However, even in such cases, this embodiment of the motor control device 1 can exercise accurate control over the number of rotations of the vertical motion motor M2.

Although the preferred embodiments of the present invention have been described above, the present invention is not limited to the above embodiment, and various modifications and changes may be made in the present invention without departing from the spirit and scope thereof. For example, the motor control device 1 may be adapted to adjust the mirror surface of the door mirror 2 so as to orient to the left and to the right from a home-position angle to a predetermined angle by controlling the rotation of the lateral motion motor M1 in accordance with an input of left and right blinker signals generated in a manner interlocked with a switching operation of blinkers of the vehicle.

In conclusion, in the motor control device for a vehicular power mirror according to the present invention, if the signal level of the motor brush switching signals generated from the driving motor is low for some reasons and thus dropouts or omission of the pulse signals take place, an interval between a pulse signal to be currently counted and an immediately preceding pulse signal thereof becomes longer than a predetermined average interval; therefore, the pulse signal counter makes a correction of the number of counts by adding one pulse thereto. Therefore, according to the present invention, even if the signal level of the motor brush switching signals generated from the driving motor is low for some reasons, accurate control can be exercised over the number of rotations of the driving motor.

What is claimed is:

1. A motor control device for a vehicular power mirror comprising:
    a driving motor that is constructed of a direct current brush motor;
    a motor signal detector that utilizes a pickup coil connected in series with the driving motor to detect high-frequency motor brush switching signals generated from the driving motor, and outputs the detected high-frequency motor brush switching signals shaped in a waveform of pulse signals; and
    a pulse signal counter that counts the pulse signals, wherein the pulse signal counter makes a correction of the number of counts by adding one pulse thereto every time an interval between a pulse signal to be currently counted and an immediately preceding pulse signal thereof is longer than a predetermined average interval.

2. A motor control device for a vehicular power mirror according to claim 1, wherein the correction of the number of counts by the pulse signal counter is made during a period of time when a rotational speed of the driving motor is stable.

* * * * *